United States Patent [19]

Tomlinson

[11] Patent Number: 4,790,424
[45] Date of Patent: Dec. 13, 1988

[54] CONVEYING SYSTEMS

[75] Inventor: Lee E. Tomlinson, Plymouth, Minn.

[73] Assignee: Environmental Air Contractors, Inc., St. Paul, Minn.

[21] Appl. No.: 5,669

[22] Filed: Jan. 21, 1987

[51] Int. Cl.[4] ............................................. B65G 47/26
[52] U.S. Cl. .................................. 198/457; 198/469.1; 198/465.1; 198/611
[58] Field of Search ............... 198/465.3, 803.2, 465.1, 198/803.01, 580, 779, 801, 611, 457, 469.1; 414/83, 84

[56] References Cited

U.S. PATENT DOCUMENTS

| | | | |
|---|---|---|---|
| 2,323,174 | 6/1943 | Wikle | 414/77 |
| 2,875,908 | 3/1959 | Woodcock | 414/84 X |
| 2,878,948 | 3/1959 | Keyes | 414/83 X |
| 3,068,987 | 12/1962 | Franklin | 198/465.3 X |
| 3,371,769 | 3/1968 | Beninger | 198/801 X |
| 3,415,353 | 12/1968 | Oertle, Jr. | 198/801 X |
| 3,529,732 | 9/1970 | Wayne | 414/84 X |
| 3,993,189 | 11/1976 | Khoylian et al. | 198/464.3 |
| 4,109,781 | 8/1978 | Moons | 198/463.3 |
| 4,196,802 | 4/1980 | Lorentzen | 198/465.3 |
| 4,232,779 | 11/1980 | Khoylian et al. | 198/465.3 |
| 4,239,433 | 12/1980 | Hanson | 414/84 |
| 4,503,968 | 3/1985 | Khoylian et al. | 198/465.3 |
| 4,505,375 | 3/1985 | Kuster | 198/801 X |
| 4,562,650 | 1/1986 | Nagasawa et al. | 34/149 |

Primary Examiner—Robert J. Spar
Assistant Examiner—Cheryl L. Gastineau
Attorney, Agent, or Firm—Jacobson and Johnson

[57] ABSTRACT

A carousel conveyor system for transporting articles, including a first conveyor for directing articles in a general horizontal direction, a set carousel conveyor carrier having a first section for elevating an article from the first conveyor and a second section for lowering an article onto the first conveyor, with the carousel conveyor having a plurality of rollers for supporting an article as the article is raised or lowered, and the carousel conveyor having apparatus for powering the rollers to propel an article from the first section of the carousel conveyor to the second section of the carousel conveyor.

8 Claims, 3 Drawing Sheets 4,790,424

CONVEYING SYSTEMS

BACKGROUND OF THE INVENTION

1. Field of the Invention

This invention relates generally to a carrousel conveying system and, more particularly, to improvements in conveying systems which are used for storing, processing, or drying articles.

2. Description of the Prior Art

The Khoylian U.S. Pat. No. 3,993,189 discloses a processing conveyor that incorporates both vertical and horizontal movement. However, instead of using carrier rollers, Khoylian uses transfer mats and unlatching sections that propel products in a horizontal direction.

The Khoylian U.S. Pat. No. 4,232,779 shows infeed and discharge assemblies which are mechanically actuated, Khoylian also shows another flexible mat system for switching an article from a vertical to a horizontal movement.

The Khoylian U.S. Pat. No. 4,503,968 shows a track that is reciprocated vertically.

The Nagasawa U.S. Pat. No. 4,562,650 discloses a board drying apparatus having a pair of fork conveyors to carry a board downwardly.

The Franklin U.S. Pat. No. 3,068,987 teaches that carrier rollers are used to transport articles horizontally.

BRIEF SUMMARY OF THE INVENTION

Briefly, the invention comprises a set of carrousel conveyors with each carrousel conveyor comprising two endless chains with a plurality of spaced carrier rollers connected between the two endless chains. In operation the chains and carrier rollers comb up through a horizontal conveyor to pick up articles from the horizontal conveyor. The articles are vertically carried upward by simultaneous and synchronous rotation of a set of carrousel conveyors. Once the article is lifted to the top of the carrousel conveyors, a drive wheel rotates a carrier roller on each of the carrousel conveyors to transfer the articles in a horizontal direction to a descending side of the carrousel conveyors. After the article has been transferred to the descending side, the articles are carried downward by the carrier rollers on the carrousel conveyors and deposited on the horizontal conveyor.

DESCRIPTION OF THE PREFERRED EMBODIMENTS

Figure 1:
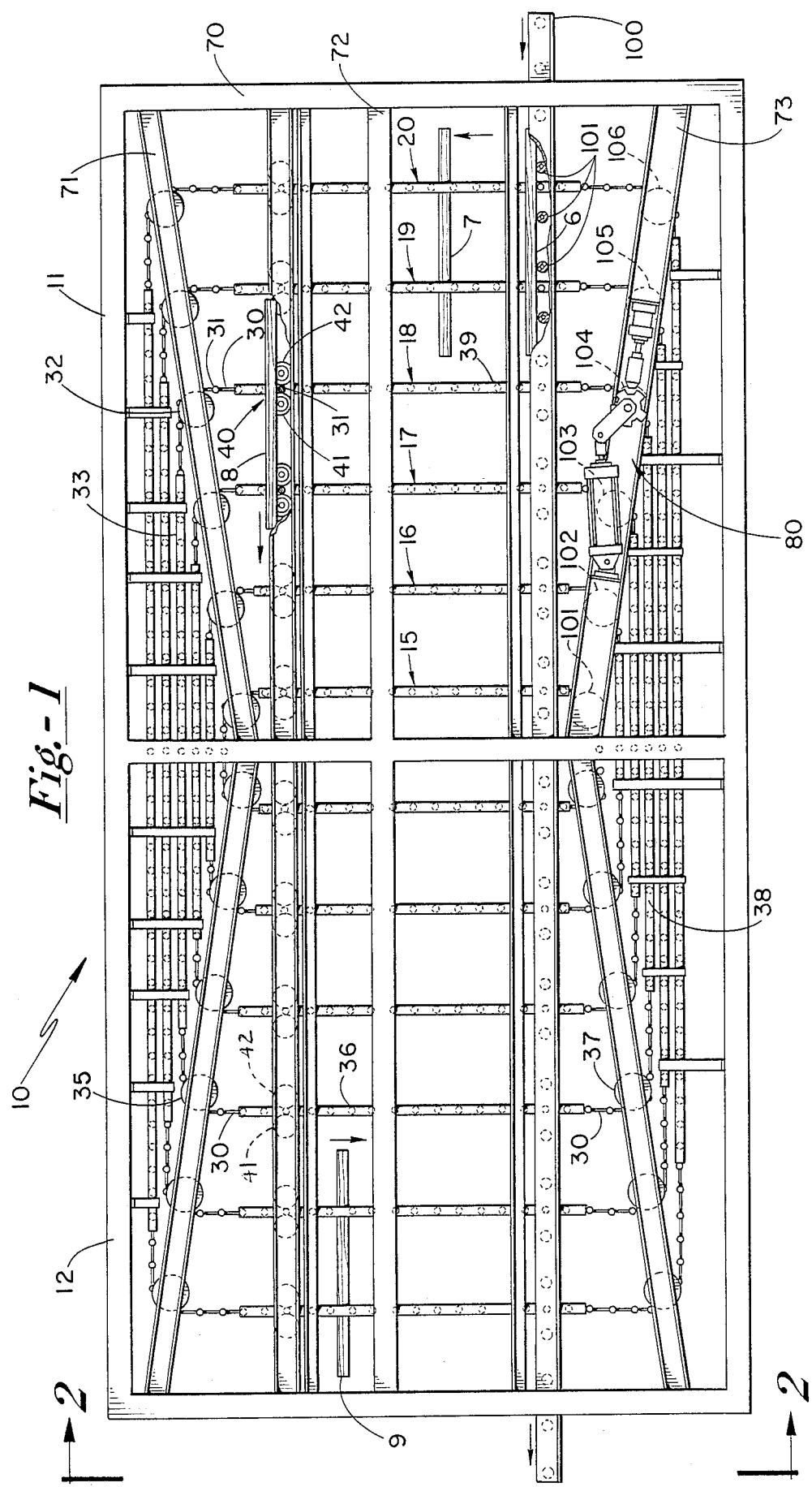
FIG. 1 is a front elevation view of my carrousel conveying system.

Referring to FIG. 1, reference numeral 10 generally designates the carrousel conveyor system. Carrousel conveyor system comprises a first conveyor 100 having a plurality of powered rollers 101 for rollingly conveying articles in a general horizontal direction as indicated by the arrows. Rollers 101 are powered by a motor and chain drive system (not shown).

Figure 2:
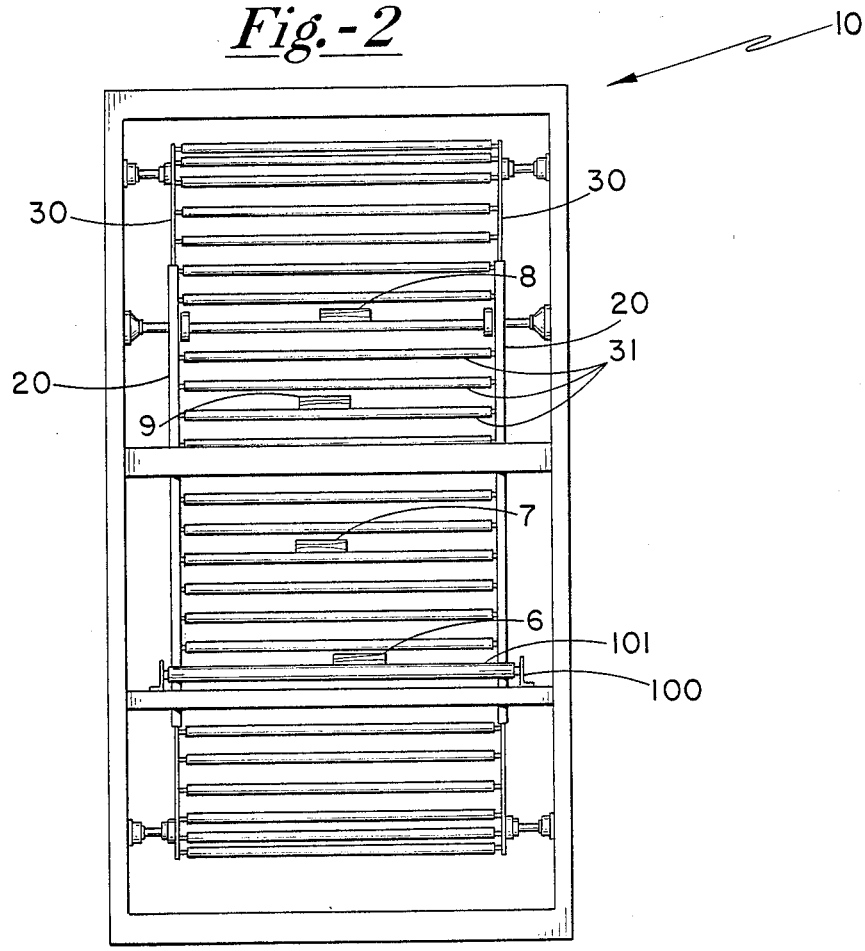
FIG. 2 is an end view of my carrousel conveying system.

FIG. 2 shows an end view of carrousel conveyor system 10 and first conveyor 100 with powered rollers 101 that rotate counter-clockwise to support and propel an article 6 into carrousel conveyor system 10. FIG. 2 also shows rollers 101 of conveyor 100 extending outward beyond the ends of carrousel conveyor 20. The horizontal propelling action of roller 101 in conveyor 100 is best illustrated in FIG. 1 which shows a plurality of rollers 101 supporting and propelling article 6 through openings between the rollers 31 in carrousel conveyors 19 and 20. Conveyor rollers 101 which rotate in a counter-clockwise direction propel article 6 from right to left in conveyor system 10.

Located in a combing relationship to the rollers 101 in conveyor 100 is the carrousel conveyor that includes a set of six carrousel conveyors 15, 16, 17, 18, 19 and 20 that rotate in synchronization with one another. Since all carrousel conveyors are identical except for the size of the carrousel conveyor, only one of the carrousel conveyors will be described in detail.

A reference to FIG. 1 shows that there are two elevating sections to the carrousel conveyor system, a right hand section 11 in which articles are elevated upward from conveyor 100 and a left hand section 12 in which articles are elevated downward onto conveyor 100.

Figure 4:
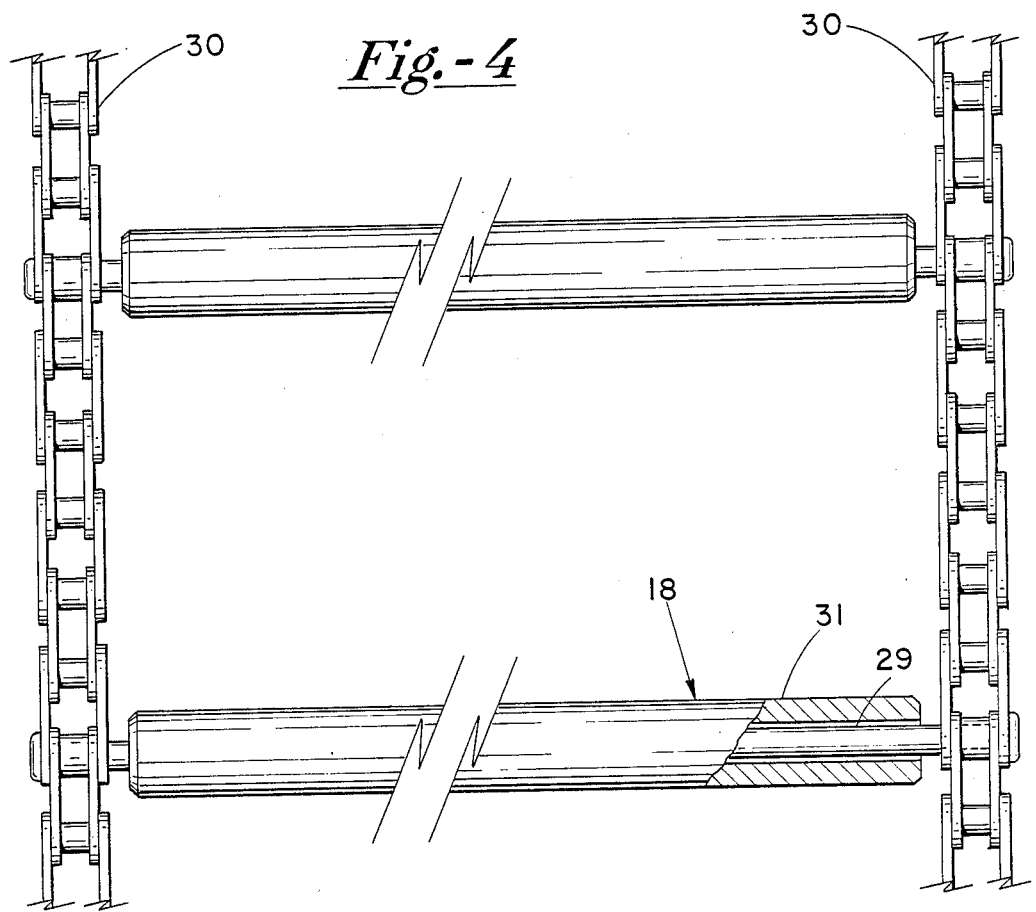
FIG. 4 is a detail view of the roller carriers for my carrousel conveyor.

Each carrousel conveyor 18 forms an endless loop comprised of a pair of spaced endless roller link chains 30 having a plurality of elongated rollers 31 intermittenly spaced along and between the pairs of chains 30. FIG. 4 shows that rollers 31 extend from chain to chain in a parallel spaced relationship with sufficient spacing to permit articles to be horizontally inserted between rollers of adjacent carrousel conveyors. Chains 30 are the typical commercially available metal link roller chains 30. Since both chains 30 of carrousel conveyor 18 are alike and follow in identical tracks and over identical rollers, only one side of chains 30 and its tracks will be described. FIG. 1 shows chain 30 passes around a top idler wheel 32 and into a U-shaped top track 33 which horizontally supports roller chain 30 and rollers 31 in a spaced relationship from other carrousel conveyors. Roller chain 30 emerges to the opposite end of track 33 where roller chain 30 passes around a further top idler wheel 35. Roller chain 30 then is guided down a vertical U-shaped track 36 which maintains roller chain 30 and rollers 31 in a vertical, spaced parallel relationship to adjacent carrousel conveyors. As roller chain 30 emerges from the lower end of track 36, it passes around a lower idler wheel 37. Roller chain 30 then enters a horizontal U-shaped track which horizontally supports roller chain 30 and rollers 31 in a horizontal spaced relationship to adjacent carrousel conveyors. Roller chain 30 emerges from lower horizontal track 38 and passes around a drive wheel 104 and into a vertical U-shaped track 39 that guides the chain in a vertical spaced parallel relationship to adjacent carrousel conveyors. Thus the tracks and rollers hold endless chain 30 in a horizontal and vertical orientation to permit rotation of carrousel conveyor 18.

The details of the fastening of the individual elongated rollers to chain 30 can be shown more clearly in FIG. 4 which shows the parallel spaced relation of link chains 30 with individual pivotal links. Fastened between links 30 is a cylindrical connecting support shaft 29 and an elongated roller 31 which is free to rotate about shaft 29 which connects chains 30 to each other. The rotatable feature of rollers 31 in carrousel conveyors is to provide for horizontal transfer of articles through the vertically orientated carrousel conveyors.

In order to rotate a selected roller 31 on chain 30, there are provided a set of drive rollers 41 and 42 which are located at the top of the conveyor system. (FIG. 1) Drive rollers 41 and 42, which are shown in greater detail in FIG. 3, can be brought into pressure contact with an individual roller 31 in carrousel conveyors 18 to thereby rotate roller 31 in carrousel conveyor 18 in a counter-clockwise direction to permit horizontal transfer of articles from the right hand section 11 to left hand section 12. It should be noted that drive rollers 41 and 42 have identical counterparts in carrousel conveyors 15, 16, 17, 19 and 20 with drive rollers 41 and 42 positioned to drive rollers in the same horizontal plane. In the preferred embodiment a single roller 31 located in the same horizontal plane in each of the carrousel conveyors 15–20 is intermittently driven in a counter-clockwise direction to form a top horizontal conveyor system that will propel articles from the top of right hand section 11 to the top of left hand section 12. In effect, articles are propelled horizontally through the set of vertically orientated carrousel conveyors 15, 16, 17, 18, 19 and 20.

In operation of conveyor system 10, with both horizontal conveyor 100 and carrousel conveyors 15, 16, 17, 18, 19 and 20, an article 6 enters on conveyor 100, and is propelled inward through the open spacing in the carrousel conveyors 19 and 20. To lift or elevate article 6 off conveyor 100, one rotates carrousel conveyors 15–20 in a counter-clockwise direction to permit connecting rollers 31 in the carrousel conveyors to engage and lift article 6 vertically upward from rollers 101. FIG. 1 shows article 7 has been partially lifted. FIG. 1 also shows article 8 located at the top position of carrousel conveyors 17 and 18. Article 8, which is at the top of carrousel conveyors 17 and 18, is in the process of being transported from the top of right section 11 to the top of left section 12 by utilizing a roller 31 of each of the vertical carrousel conveyors as a second horizontal conveyor system. That is, activating drive rollers 41 and 42 located in each of the carrousel conveyors 15–20, one can transfer articles 8 from the top of right hand section 11 to the top of left hand section 12. During the conveying of article 8 from the top of right hand section 11 to the top of left hand section 12, each of carrousel conveyors 15–20 are prevented from rotational movement. Also, each of the carrousel conveyors 15–20 are stopped in the same orientation so that each of rollers 31 are located in a spaced parallel alignment to form a horizontal supporting surface for article 8. Once an article is transferred from the top of right hand section 11 to the top of left hand section 12, the carrousel conveyors can be rotated to lower articles until the articles are deposited on top of rollers 101 on the bottom of left hand section 12. FIG. 1 shows article 9 as it is being lowered.

The process of the present invention utilizes the intermittent counter-clockwise rotation of carrousel conveyors 15–20 to provide the elevating and lowering action and the intermittent rotation of an individual roller 31 on both the left hand and right hand side of carrousel conveyors 15–20 to provide the horizontal transfer from the top of right hand section 12 to the top of left hand section 10.

Figure 3:
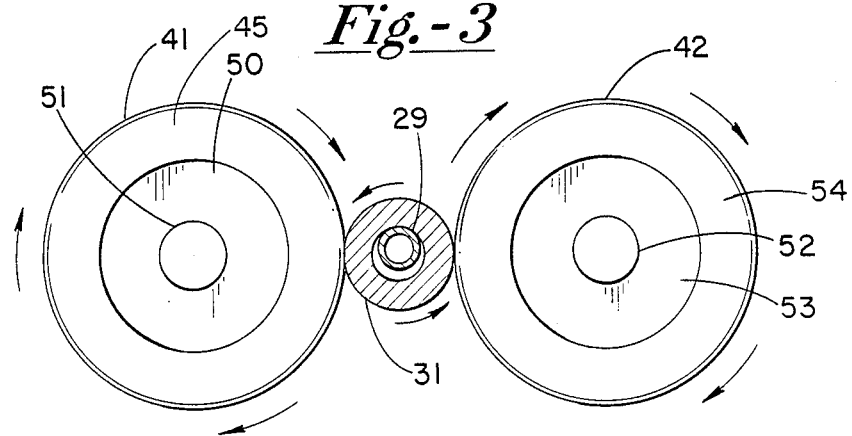
FIG. 3 is a detail view of the roller drive system of my carrousel conveyor system.

The drive mechanism for propelling an individual rollers 31 of the carrousel conveyors can be seen in more detail in FIG. 3. Since the drive mechanism for all carrousel conveyors 15–20 are identical, only one will be described herein. Each of carrousel conveyors 15–20 has two drive mechanisms, one in the top of left hand section 12 and one in the top of right hand section 11. FIG. 3 shows a roller 31 located in frictional engagement with drive wheels 41 and 42. Drive wheels 41 and 42, which are powered from an electric motor (not shown), form frictional contact with roller 31 to rotate roller 31 in a counter-clockwise direction as indicated by the arrows. Drive wheel 41 typically comprises an outer frictional surface 45 made of rubber or the like, a hub 50 and a drive axle 51. Similarly, drive wheel 42 has a center hub 53, a drive axle 52 and an outer frictional drive surface 54 to form frictional engagement with roller 31. FIG. 3 illustrates drive wheels 41 and 42 in frictional contact with rollers 31. During vertical rotation of carrousel conveyors 15–20 each of drive rollers 41 and 42 displace away from roller 31 through a slide mechanism (not shown) to prevent drive rollers 41 and 42 from interfering with the rotation of carrousel conveyors 15–20.

In order for carrousel conveyors 15–20 to propel articles from right to left in a horizontal direction, one simultaneously rotates rollers 31 which are located in the same horizontal plane in carrousel conveyors 15–20. In the preferred embodiment each of carrousel conveyors 15–20 are stopped as an individual roller 31 in each of the carrousel conveyors 15–20 is rotatively driven by drive rollers 41 and 42 to transfer articles in a horizontal direction.

In order to elevate or lower articles in conveyor system 10 one can simultaneously and synchronizely rotate each of the carrousel conveyors 15–20. The synchronization of rotation of carrousel conveyors 15–20 is accomplished through a set of connecting drive wheels 101, 102, 103, 104, 105 and 106 which are connected to each other through a series of roller chains (not shown). Each of the drive wheels has a set of peripherally spaced teeth that connect to chain 30 and each of the drive wheels has a second set of peripherally spaced teeth and a roller chain that connects a drive wheel to an adjacent drive wheel . The interconnection of drive wheels by a roller link chain (not shown) ensures that rotation of one drive wheel causes a corresponding rotation of the drive wheels for all of the other carrousel conveyors 15–20.

FIG. 1 shows the master carrousel drive mechanism 80 for rotating carrousel conveyors 15–20. The master carrousel conveyor drive mechanism 80 is shown in greater detail in FIG. 5 and comprises a pneumatic or hydraulic cylinder 90 which is pivotally mounted to frame 73 by a pivot pin 91. Located on the under side of cylinders 90 are a pair of inlet and outlets 93 and 94 to provide for retraction and extension o member 92. Pressure cylinder 90 is a conventional type of fluid cylinder which is commercially available. One end of member 92 pivotally connects to a level arm 95 which connects to a locating wheel 96 through a one way ratchet mechanism (not shown) which is identical to the type used in socket wrenches.

The purpose of a one way ratchet mechanism is to provide for rotation of locating wheel 96 only during the contraction of member 92. That is, extension of member 92 produces clockwise rotation of arm 95 but no rotation of locating wheel 96. While contraction of member 92 produces counter-clockwise rotation of member 95 and counter-clockwise rotation of locating wheel 96. Locating wheel 96 has spaces 97 therein for engagement with a holding device 98. A drive shaft 89 connects locating wheel 96 to drive roller 104 located on the opposite side of frame 73 (shown in outline in FIG. 1). Since shaft 89 connects directly to drive wheel 104 a partial rotation of locating wheel 96 causes a corresponding rotation of drive wheel 104. Since drive wheel 104 connects to adjacent drive wheels through roller link chains, the rotation of drive wheel 104 produce simultaneous rotation of drive wheels 101, 102, 103, 105 and 106 of carrousel conveyors 15–20.

Figure 5:
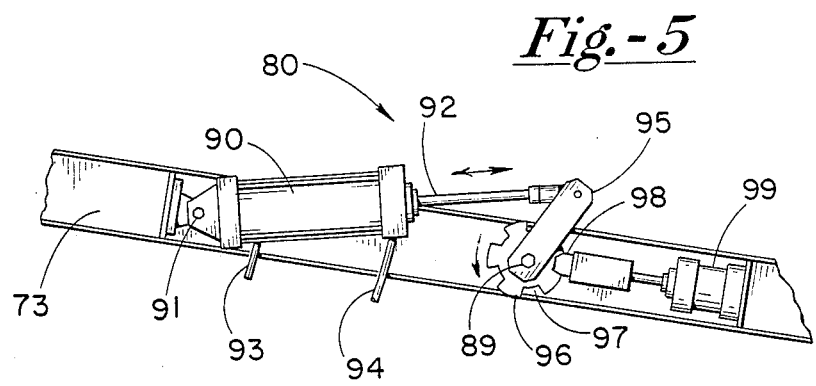
FIG. 5 is a detail view of the mechanism for rotating the set of carrousel conveyors.

FIG. 5 shows an alignment member 98 fitted in space 97 of locating wheel 96 thereby preventing rotation of locating wheel 96. The alignment member 98 can be retracted or extended by a solonoid 99 which extends or retracts member 98 in response to an external electrical signal. When member 98 is in the extended position as shown in FIG. 5 member 98 prevents locating wheel 96 and carrousel conveyors 15–20 from rotating. Since lower arm 95 is ratchetly connected to locating wheel 96, member 92 can be extended without producing rotation of locating wheel 96. To rotate carrousel conveyors 15–20, member 98 is retracted (FIG. 1) and member 92 is contracted which produces partial rotation of locating wheel 96 which, through axle 89 and drive wheels, provides a corresponding partial rotation of carrousel conveyors 15–20. Thus one of the purposes of master drive mechanism 80 is to provide a simultaneously and limited rotation of the carrousel conveyors which provide intermittent and controlled movement of the articles in conveyor 10. Also, the use of an alignment member 98 assures that each of the carrousel conveyors is at the proper rotation orientation to ensure that articles can be conveyed by conveyor 100 into the spacing between rollers 31 on carrousel conveyors 15–20.

I claim:

1. A conveyor system for transporting articles comprising:
   a first conveyor for conveying articles in a first direction;
   a second conveyor having a section for removing an article from said first conveyor, said second conveyor having a carrier roller for supporting an article as the article is removed from said first conveyor, said second conveyor having at least two carrousel conveyors with a section for elevating an article and a section for lowering an article, each of said carrousel conveyors comprises a pair of endless chains with a rotatable carrier roller connecting each of said endless chains; and
   a pair of friction drive rollers for engaging said carrier roller for moving said carrier roller to propel an article away from said section for removing an article from said first conveyor.

2. The system of claim 1 wherein said system includes a further means for intermittently rotating said carrousel conveyors.

3. The system of claim 2 wherein said system further means includes a power cylinder for rotating said carrousel conveyors and a latch mechanism for preventing rotation of said carrousel conveyors.

4. The system of claim 3 including at least 6 concentrically spaced carrousel conveyors.

5. The system of claim 4 including a set of tracks to guide said carrousel conveyors.

6. The system of claim 5 wherein said carrousel conveyors have support rollers arranged to hold said carrier carrousel conveyors in a rectangular arrangement.

7. The system of claim 1 wherein said carrousel conveyors have a portion located in a perpendicular direction to the first conveyor.

8. The system of claim 1 wherein said carrousel conveyors comprise sets of endless chains connected by spaced support shafts.

* * * * *